United States Patent
Huart et al.

(10) Patent No.: US 7,072,959 B2
(45) Date of Patent: Jul. 4, 2006

(54) METHOD AND APPARATUS FOR DYNAMICALLY ASSIGNING A NETWORK ENDPOINT TO A NETWORK REGION FOR SELECTING A PROPER CODEC

(75) Inventors: Pascal H. Huart, Dallas, TX (US); Luke K. Surazski, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 750 days.

(21) Appl. No.: 10/050,228

(22) Filed: Jan. 15, 2002

(65) Prior Publication Data

US 2003/0158968 A1    Aug. 21, 2003

(51) Int. Cl.
*G06F 15/173* (2006.01)

(52) U.S. Cl. .............. 709/223; 709/227; 709/249; 370/352; 370/356

(58) Field of Classification Search .......... 709/223, 709/249; 370/352, 356; 455/436
See application file for complete search history.

(56) References Cited

U.S. PATENT DOCUMENTS

| | | | | |
|---|---|---|---|---|
| 6,078,582 A * | 6/2000 | Curry et al. | .......... | 370/356 |
| 6,546,003 B1 * | 4/2003 | Farris | .......... | 370/352 |
| 6,597,906 B1 * | 7/2003 | Van Leeuwen et al. | ..... | 455/436 |
| 6,678,280 B1 * | 1/2004 | Kim et al. | .......... | 370/429 |
| 6,856,616 B1 * | 2/2005 | Schuster et al. | .......... | 370/352 |
| 2001/0006519 A1 * | 7/2001 | Voit | .......... | 370/352 |
| 2001/0049746 A1 | 12/2001 | Shin | .......... | 709/239 |
| 2001/0055299 A1 * | 12/2001 | Kelly | .......... | 370/352 |
| 2002/0167937 A1 * | 11/2002 | Goodman | .......... | 370/352 |
| 2002/0196776 A1 | 12/2002 | Chiang | .......... | 370/352 |
| 2003/0088421 A1 * | 5/2003 | Maes et al. | .......... | 704/270.1 |
| 2003/0128692 A1 * | 7/2003 | Mitsumori et al. | .......... | 370/352 |

FOREIGN PATENT DOCUMENTS

| | | |
|---|---|---|
| EP | 1 107 538 A2 | 6/2001 |
| EP | 1 113 647 A2 | 7/2001 |
| WO | WO 98/59467 | 12/1998 |
| WO | WO 01/45374 A1 | 6/2001 |

OTHER PUBLICATIONS

International Search Report in International Application No. PCT/US 03/01114, dated May 12, 2003, 7 pages.

* cited by examiner

*Primary Examiner*—Wen-Tai Lin
(74) *Attorney, Agent, or Firm*—Baker Botts L.L.P.

(57) ABSTRACT

A communication system includes a server, a call manager, and a plurality of network endpoints. The network endpoints are assigned to network regions to allow selection of a proper compression/decompression algorithm (codec) for a call between the network endpoints. In one embodiment, the server receives a request for a network address from a network endpoint, and communicates the network address and a network location parameter identifying a network region to the endpoint. In another embodiment, the call manager receives a call request from a network endpoint and determines a network region for the endpoint based on the endpoint's network address. In yet another embodiment, an endpoint determines its own network region based on its network address.

40 Claims, 6 Drawing Sheets

| NETWORK ADDRESS (502) | ENDPOINT IDENTIFIER (508) | PRIORITY 1 (504) | | PRIORITY 2 (506) | |
|---|---|---|---|---|---|
| | | REGION | REGION IDENTIFIER | REGION | REGION IDENTIFIER |
| 200.100.47.1 | 1234 | A | 1 | A | 1 |
| 200.100.47.2 | 1235 | A | 1 | A | 1 |
| 200.100.48.1 | 1236 | B | 2 | B | 2 |
| 200.100.48.2 | 1237 | B | 2 | B | 2 |
| 200.100.49.1 | 1238 | C | 3 | C | 3 |
| 200.100.49.2 | 1239 | C | 3 | D | 4 |
| 200.100.49.3 | 1240 | C | 3 | D | 4 |

FIG. 5

TABLE 600

| FIRST REGION (602) | SECOND REGION (604) | PRIORITY 1 (606) | | PRIORITY 2 (608) | |
|---|---|---|---|---|---|
| | | CODEC | BW (Kbps) | CODEC | BW (Kbps) |
| A | A | LINEAR | 1000 | LINEAR | 1000 |
| A | B | G.711 | 64 | G.729 | 8 |
| A | C | G.729 | 8 | G.729 | 8 |
| A | D | G.729 | 8 | G.729 | 8 |
| B | B | LINEAR | 1000 | LINEAR | 1000 |
| B | C | LINEAR | 256 | LINEAR | 256 |
| B | D | G.711 | 64 | G.729 | 8 |
| C | C | LINEAR | 1000 | LINEAR | 1000 |
| C | D | LINEAR | 256 | G.729 | 8 |
| D | D | G.729 | 8 | G.729 | 8 |

METHOD AND APPARATUS FOR DYNAMICALLY ASSIGNING A NETWORK ENDPOINT TO A NETWORK REGION FOR SELECTING A PROPER CODEC

TECHNICAL FIELD OF THE INVENTION

This invention relates in general to network communication, and more particularly to a method and apparatus for dynamically assigning a network endpoint to a network region.

BACKGROUND OF THE INVENTION

Voice-over-packet (VoP) technology has become increasingly prevalent in recent years. Varying bandwidths and network connections require different degrees of compression for successful transmission of voice traffic. As networks become more complicated, the selection of proper compression algorithms for communications from a network endpoint becomes increasingly difficult. Network device mobility further complicates the efficient management of bandwidth and proper selection of compression algorithms.

SUMMARY OF THE INVENTION

In accordance with the present invention, the disadvantages and problems associated with managing bandwidth and codec selection for network endpoints have been substantially reduced or eliminated. In particular, the present invention discloses a method and apparatus for dynamically assigning network endpoints to network regions.

In accordance with one embodiment of the present invention, a server receives a request for a network address for a network endpoint. The server determines a network address for the network endpoint and further determines a network region for the network endpoint. The server communicates both the network address and the network region to the network endpoint.

In accordance with another embodiment of the present invention, a call manager receives a call request including a call destination from a network endpoint. Based on the network address of the network endpoint, the call manager determines the network region for the network endpoint and the call destination. Using the network regions of the network endpoint and the call destination, the call manager determines a codec for the communication between the network endpoints, and applies the codec to the communication between the endpoints.

In accordance with yet another embodiment of the present invention, a network endpoint stores a table relating network addresses to network regions. The network communicates a request for a network address using an interface. The network endpoint receives its network address and determines its network region in the table using the network address. When placing a call, the network endpoint sends its network region to a call manager. The call manager then determines a proper codec for the communication, which may be either stored locally at the endpoint or found elsewhere in the network. If the codec is stored on the phone, the call manager sends a direction to network endpoint instructing network endpoint to apply codec to the communication. Otherwise, the call manager directs network endpoint to couple to a port of a network codec.

Important technical advantages of certain embodiments of the present invention include rapid assignment of a new network region for a network endpoint. Because a network region can be dynamically assigned, the present invention reduces or eliminates server reconfiguration in the network to reflect a new address for the network endpoint each time the network endpoint moves to a new network region. This results in greater versatility of the network endpoint, as well as savings in time to configure the system.

Another important technical advantage of certain embodiments of the present invention is that the invention can be incorporated into a variety of components in a variety of ways. For example, the invention can be included in servers, call managers, or network endpoints. Furthermore, the present invention can be included in components ordinarily found in networks, and consequently may not require new types of hardware and/or software.

Yet another important technical advantage of certain embodiments of the present invention is call prioritization. In accordance with one embodiment of the present invention, a call priority can be associated with a call from a network endpoint. Call priority can provide a guaranteed connection from anywhere in the network by ensuring that the call never uses more bandwidth than is available. Alternatively, call priority can require that the least possible compression is used, so that the user gets the highest quality call possible.

Numerous other technical advantages will be apparent to one skilled in the art. It is understood that some, all, or none of the technical advantages described may be present in any particular embodiment of the invention. The technical advantages and scope of the invention may better be understood with reference to the following drawings, description, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
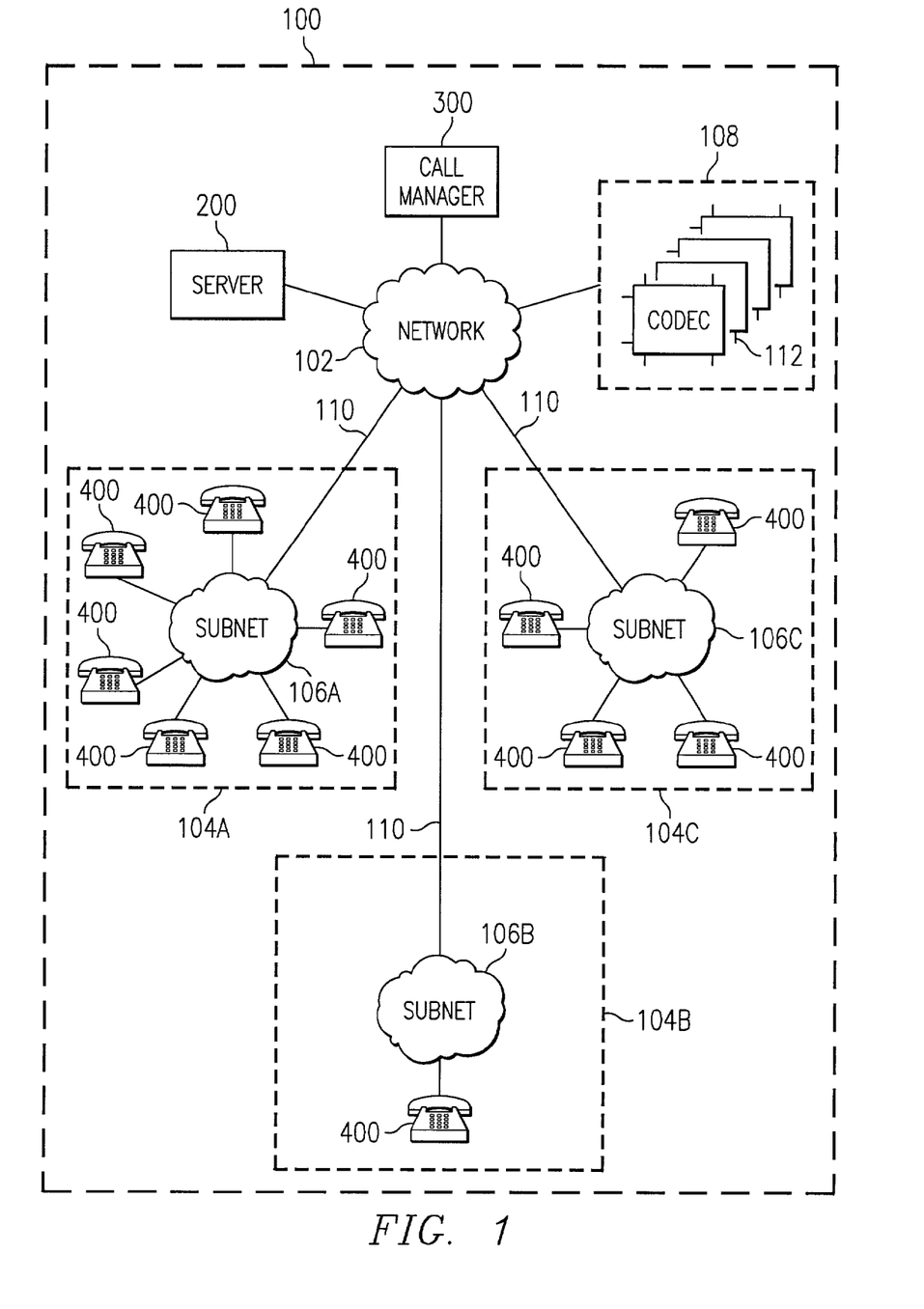
FIG. 1 depicts a communication system in accordance with the present invention.

FIG. 1 depicts a communication system 100 having various components in communication with one another over a network 102. The components of the communication system 100 include network endpoints 400 located in network regions 104, each region 104 having a particular subnet 106. Communication system 100 also includes a server 200, call manager 300, and a set of codecs 108. Network 102 may be a local area network (LAN), a wide area network (WAN), the Internet or other similar network that transmits packets, cells, frames, or other segments (generally referred to as packets) of voice, video, data, and other information (generally referred to as media) In a particular embodiment, network 102 may be an Internet protocol (IP) network. Generally, network 102 may be any type of network that allows transmission of audio and video telecommunication signals, as well as traditional data communications. Therefore, although subsequent description will primarily focus on IP communication, it should be understood that other appropriate methods of transmitting media over a network, such as frame relay, asynchronous transfer mode (ATM), synchronous optical network (SONET), or other packet-based network can also serve as network 102.

Network 102 may couple to other networks using different protocols and may communicate media between network regions 104 as well as components outside network regions 104. Network 102 may also couple to non-packet-based communication networks. For example, network 102 may couple to a private branch exchange (PBX), the public switched telephone network (PSTN) a wireless network, etc., and may communicate with all manner of media devices.

Network 102 includes several network regions 104 each of which may be defined by a particular subnet 106. Regions 104 include locations where network endpoints 400 can be coupled to the network. Network regions 104 are interconnected by communication links 110 having varying bandwidths depending on which regions 104 are connected.

Subnets 106 include any segment, portion, or part of network 102, including but not limited to a collection of several hardware components of network 102, or a part of communication facilities. A network address defining the network location of network endpoints or other devices typically includes a portion corresponding to subnet 106. Subnet 106 may be defined by the physical location of routers in network 102 and, as a result, may provide a proxy for physical location of network endpoints 400 couple to subnet 106.

Network endpoints 400 include any suitable combination of hardware and/or software that can communicate media using network 102. For example, network endpoint 400 may be a telephone, a computer running telephony software, a video monitor, or any other communication or processing hardware and/or software. In a particular embodiment, network endpoint 400 may be an IP phone that communicates media in transport control protocol/Internet protocol (TCP/IP) packets.

System 100 also includes server 200. Server 200 may be comprised of hardware, software, or any combination thereof which allows the server 200 to assign network addresses to network endpoints 400. Server 200 can be a Dynamic Host Configuration Protocol (DHCP) server or any server appropriate to the protocol of network 102 that can assign network endpoints 400 addresses within network 102.

Call manager 300 manages the overall establishment of calls between network endpoints 400. Call manager 300 is an application that controls call processing, routing, telephone features, and options. Call manager 300 may be implemented as hardware or software executed on one or more processors coupled to network 102. Call manager 300 software may be embodied in any type of computer readable medium, including but not limited to: hard drives, diskettes, CD ROMs, DVD ROMs, or other optical or magnetic storage drives.

Codecs (compression/decompression algorithms) 108 perform compression and decompression of voice packets communicated over network 102. Codecs 108 may include G.729, G.711, linear wide band, or any other appropriate algorithm for compressing and decompressing packets transmitted across network 102. Codecs 108 may include ports 112 that couple to network endpoints 400 to establish a connection between network endpoints 400. Codecs 108 can be stored as a network resource or, alternatively, can be stored locally on network endpoints 400.

In operation, system 100 establishes communication between network endpoints 400 by applying codecs 108 based on the regions 104 of network endpoints 400. Various components of system 100 can permit system 100 to dynamically respond to a new location of network endpoint 400. For example, in one embodiment, network endpoint 400 sends a request to the server 200 for a network address. Server 200 determines a network address for network endpoint 400, and uses this network address to determine a network region 104 for network endpoint 400. Server 200 then sends both the network address and a network region 104 identifier to network endpoint 400. Network region 104 identifier may take any suitable form, for example, time-length-value (TLV) data. Network endpoint 400 then communicates this network region 104 identifier to call manager 300 to enable call manager 300 to select a proper codec 108 for communication between network regions 104.

In an alternative embodiment, network endpoint 400 sends a network request to server 200 for an address when endpoint 400 is coupled to network 102. Network endpoint 400 receives a network address from server 200. When network endpoint 400 communicates a call request comprising a call destination to call manager 300, call manager 300 determines a network region 104 for network endpoint 400 based on network endpoint's 400 network address. Call manager 300 can use region 104 of network endpoint 400 and region 104 of the call destination to determine the proper codec 108 for the communication.

In yet alternative embodiment, network endpoint 400 sends a request for a network address to server 200. Server 200 responds with a network address, and network endpoint 400 uses that address to determine its own network region 104. Network endpoint 400 may communicate this network region 104 to call manager 300 to allow proper codec 108 selection for communications from endpoint 400. Alternatively, network endpoint 400 may select a codec based on network region 104.

Figure 2:
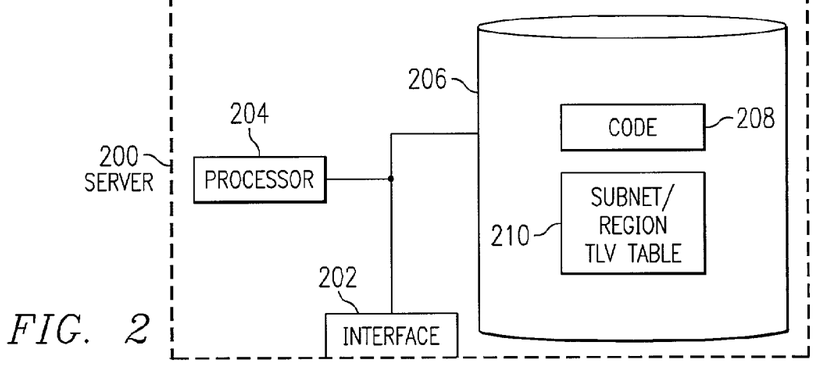
FIG. 2 depicts a server in the communication system.

FIG. 2 depicts an exemplary server 200 in greater detail. Server 200 includes an interface 202 for coupling server 200 to network 102. Interface 202 may be a physical port, virtual port, or other suitable direct or indirect connection to network 102. Server 200 is controlled by a processor 204. Processor 204 may be a microprocessor, a microcontroller, a digital signal processor (DSP), any combination of those devices, or any other circuitry configured to process information. Server 200 also has a memory 206 for storing information. Memory 206 may be any form of volatile or nonvolatile memory, including but not limited to: magnetic media, optical media, random access memory (RAM), read only memory (ROM), removable media, or any other suitable local or remote memory component. Memory 206 stores code 208 for controlling operation of server 200. In one embodiment, memory 206 also contains a subnet-to-region table 210. Table 210 may include any suitable arrangement relating network addresses to network regions. Subnet-to-region table 210 allows server 200 to identify region 104 of network endpoint 400 based on its assigned network address.

In a particular embodiment, server 200 receives a request for a network address through interface 202. Processor 204 processes this request according to instructions found in code 208. Processor 204 retrieves subnet-to-region table 210 and uses the network address that has been assigned to network endpoint 400 to determine a particular region for the network endpoint 400. Processor 204 transmits both the network address and the region identifier to network endpoint 400 through interface 202. The region identifier may be encoded as a time-length-value (TLV) data or any other suitable form of storage.

Figure 3:
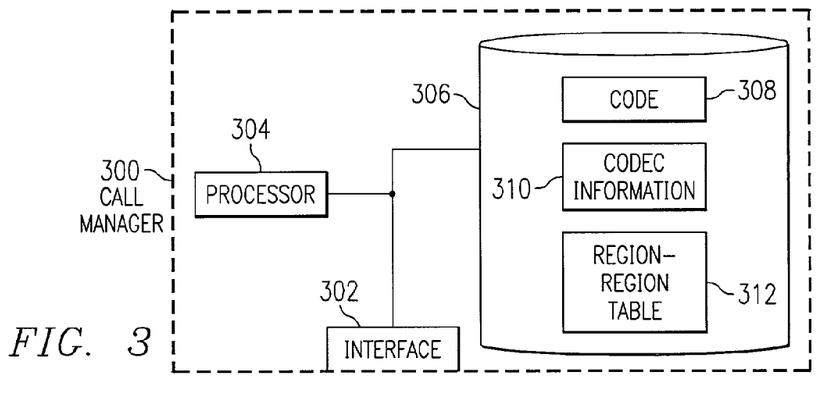
FIG. 3 depicts a call manager in the communication system.

FIG. 3 illustrates an exemplary call manager 300. Call manager 300 includes an interface 302, which may be a physical port, virtual port, or other suitable direct or indirect connection to network 102. Processor 304 may be a microprocessor, a microcontroller, a digital signal process (DSP), or any other digital circuitry configured to process information. Call manager 300 has a memory 306 for storing information. Memory 306 may be any form of volatile or nonvolatile memory, including but not limited to: magnetic media, optical media, random access memory (RAM), read only memory (ROM), removable media, or any other suitable local or remote memory component.

Memory 306 stores code 308 for directing operation of call manager 300. Memory 306 also stores codec information 310 which assists call manager 300 in selecting and monitoring available codecs 108. In a particular embodiment, codec information 310 may include available ports 112 on codecs 108. Memory 306 also stores region-to-region table 312. Region-to-region table 312 maps regions to one another by, for example, bandwidth of connection. Call manager 300 uses region-to-region table 312 to determine what codec 108 should be applied to a communication between network endpoints 400 in network regions 104 in order to allow the call to be successfully completed.

In operation, call manager 300 receives through interface 302 a call request from originating network endpoint 400 requesting a connection with a destination network endpoint 400. In a particular embodiment, call manager 300 may determine region 104 of network endpoint 400 according to its network address. Alternatively, the call request from network endpoint 400 may include information identifying region 104 of network endpoint 400. Once call manager 300 has identified region 104 of originating network endpoint 400 and the region of destination network endpoint 400, call manager 300 can look up the codec 108 required for the call in region-to-region table 312 and use codec information 310 to determine if codec 108 is available. Call manager 300 applies the required codec 108 to the communication between network endpoints 400. Applying the codec may include connecting network endpoints 400 to ports 112 of a network codec 108, or giving an instruction to network endpoints 400 to apply a local codec 108.

Figure 4:
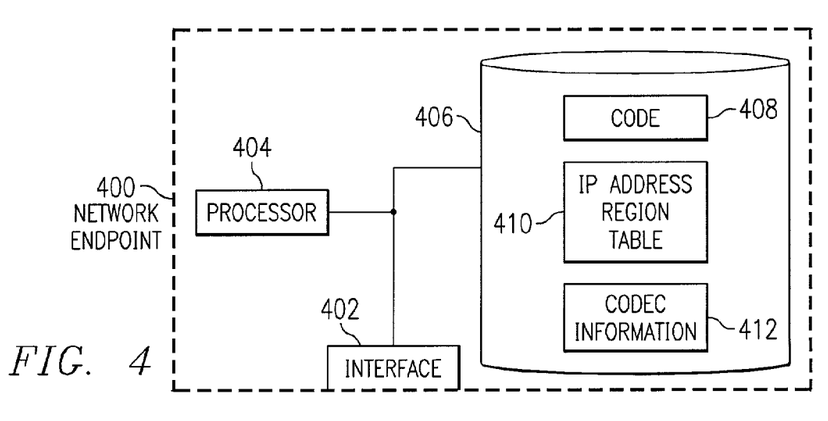
FIG. 4 depicts a network endpoint in the communication system

FIG. 4 illustrates an exemplary network endpoint 400. Network endpoint 400 includes an interface 402, a processor 404, and a memory 406. Interface 402 may be any port, virtual or physical, direct or indirect, that allows network endpoint 400 to couple to network 102. Processor 404 may be a microprocessor, a microcontroller, a digital signal processor (DSP), or any other suitable combination of circuitry that can perform processing tasks. Memory 406 may be volatile or nonvolatile, including but not limited to: magnetic media, optical media, RAM, ROM, removable media, or any other suitable local or remote memory component. Memory 406 contains code 408 for directing operations of network endpoint 400. In a particular embodiment, memory 406 may store an network-address-to-region table 410 that allows network endpoint 400 to determine its region 104 based on its network address. In a particular embodiment, memory 406 may also contain codec information 412. Codec information 412 may include on-board codecs 108, locations for codec ports 112 in network 102, or any other information that facilitates the application of codecs 108 to communications from network endpoint 400.

When coupled to network 102, network endpoint 400 sends a request for a network address to server 200. In the embodiment depicted, the network endpoint 400 receives the network address from the server 200, looks up its region based on network address using table 410, and stores its region 104 in memory 406. When a user places a call on the network endpoint 400, network endpoint 400 sends the call request to call manager 300. In a particular embodiment, network endpoint 400 may also send its region 104 information to call manager 300. After call manager 300 determines a codec 108 for the communication, call manager 300 notifies network endpoint 400 of the codec 108 selection. Alternatively, network endpoint 400 may perform codec 108 selection itself Once network endpoint 400 is notified, network endpoint 400 may work together with call manager 300 using codec information 412 apply a codec 108 to its communications. In the case where codec 108 is on board the network endpoint 400, network endpoint 400 can perform compression and decompression of communications locally.

Figure 5:
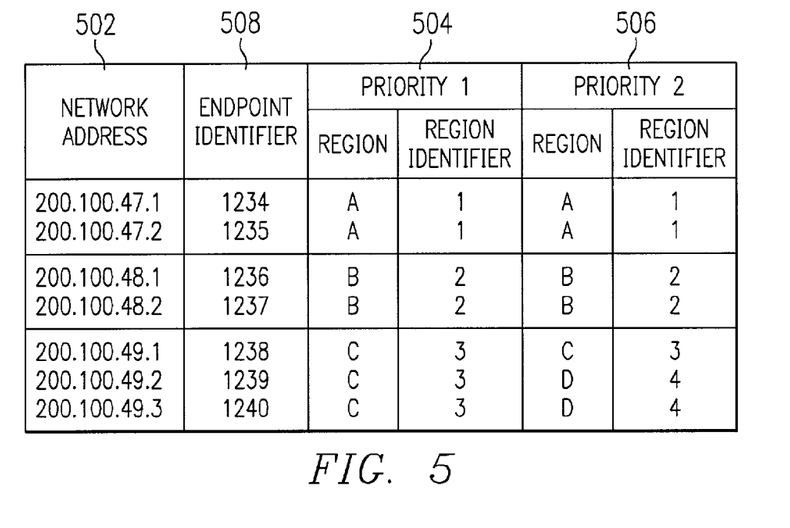
FIG. 5 is a table that relates network addresses to network regions and priorities.

FIG. 5 depicts a table 500 which may be maintained at server 200 in a particular embodiment. Table 500 relates network addresses to a particular region identifier for a region 104 based both on region 104 and on priority. For this reason, the region identifiers are divided into two columns, column 504 for priority one and column 506 for priority two. As shown in column 502, the subnet portion of the network address (shown as the second-to-last number in the network address) can be used to determine region 104 which can then be represented by a region identifier. In a particular embodiment, priority is assigned to calls based on a unique identifier, shown in column 508, for the network endpoint 400 such as a Media Access Controller (MAC) address. Alternatively, priority could be assigned at the time the call request is placed. In a particular embodiment, the region identifier is different for different priorities so that higher priority phones effectively have their own region 104. In an alternative embodiment, the region is identical no matter what the priority is. However, in that case, priority information could be stored at call manager 300 in order to allow calls to be sorted by priority. One such embodiment is shown in FIG. 6.

Figure 6:
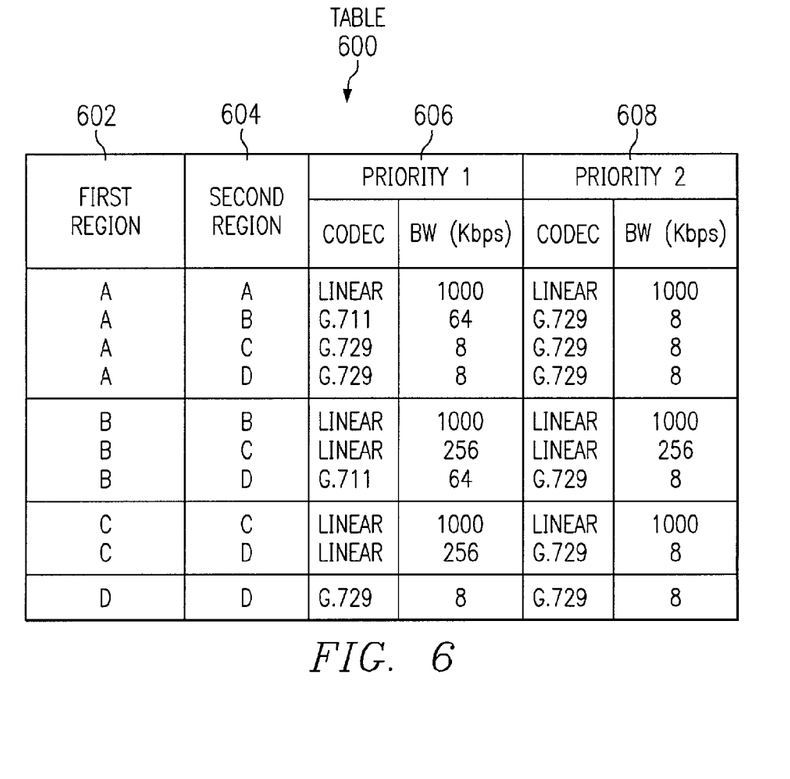
FIG. 6 is a table that indicates available bandwidth and codec selection for calls between network regions.

FIG. 6 shows a table 600 that maps a first region 602 to a second region 604. The table records bandwidth between the regions 104 and the proper codec 108 to apply to both priority one 606 and priority two 608 calls. Priority can mean either that the call should have highest quality or, in the alternative shown in FIG. 6, that the phone should be able to call regardless of network conditions (i.e., aggressive compression). Table 600 could be maintained at call manager 300, network endpoint 400, or other component of system 100 that would apply codecs 108 to a communication between network endpoints 400.

Figure 7:
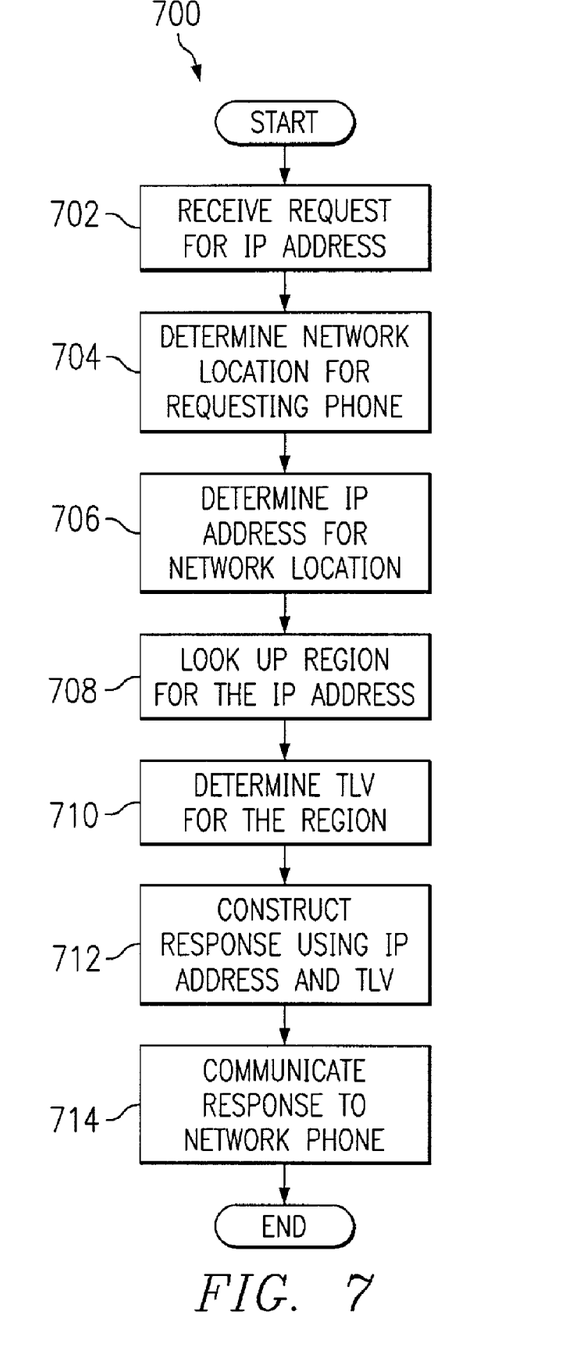
FIG. 7 is a flowchart illustrating the process for dynamically assigning a network address and a network region to a network endpoint.

FIG. 7 is a flow chart 700 depicting the process by which a call can be placed from network endpoint 400 coupled to network 102. In step 702, server 200 receives a request for an network address. Server 200 determines a network location for the requesting endpoint 400 at step 704. In step 706, server 200 determines a network address for the network location of the network endpoint 400. Server 200 looks up the region 104 for the network address at step 708. Server 200 determines a region identifier, e.g., TLV value, for the region 104 at step 710.

In steps 712 and 714, server 200 constructs and sends a response to network endpoint 400. Server 200 assembles a response including the network address for network endpoint 400 and the TLV value for region 104 at step 712. In step 714, server 200 communicates the response to network endpoint 400. Network endpoint 400 can then communicate its region 104 along with call requests to call manager 300.

Figure 8:
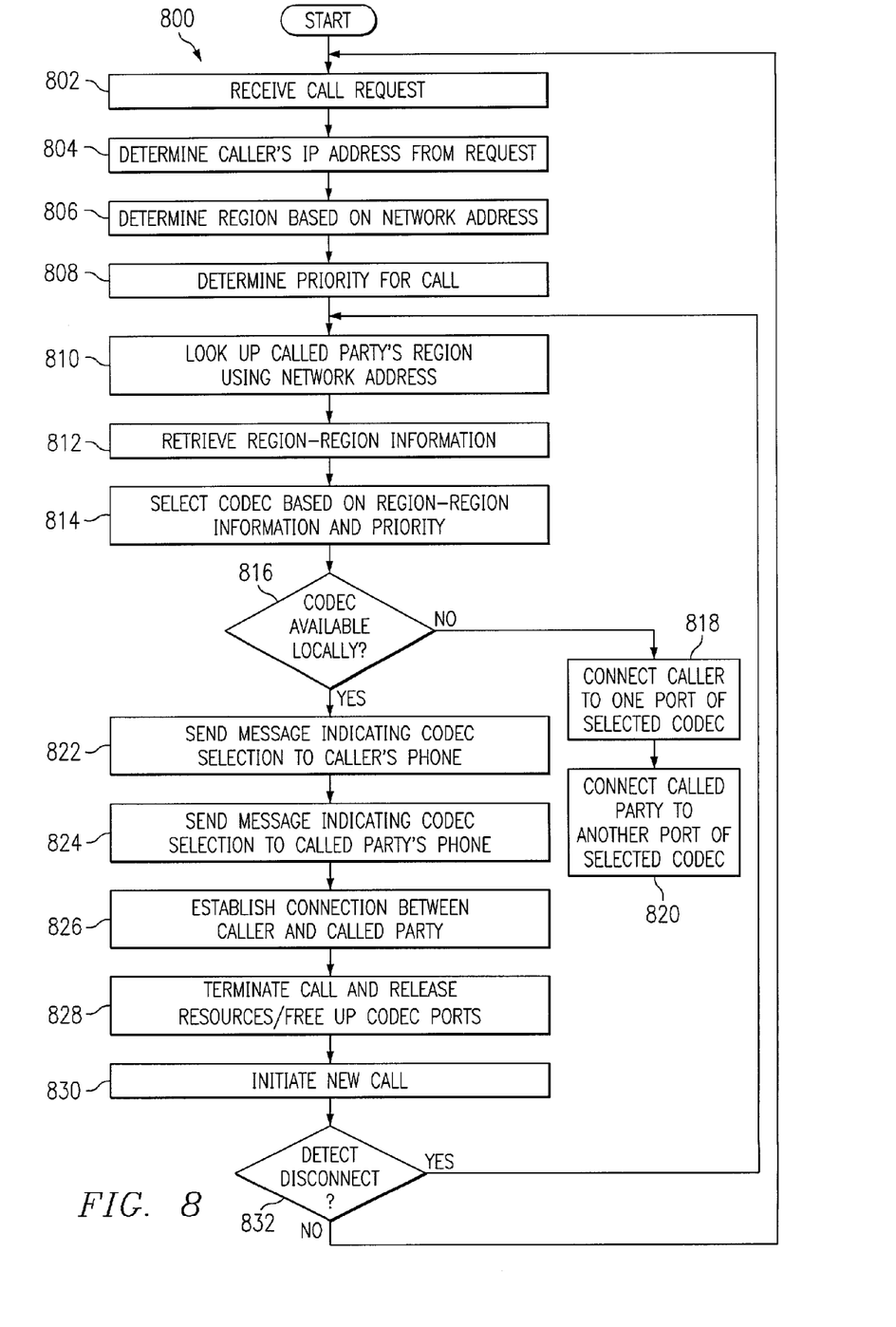
FIG. 8 is a flowchart depicting management of a call from a network phone in the communication system.

FIG. 8 depicts a flow chart illustrating a method for call manager 300 to process a call. Call manager 300 receives a call request from network endpoint 400 at step 802. In step 804, call manager 300 determines the network address of the network endpoint 400. Using the network address received, call manager 300 determines a region for network endpoint 400 at step 806. In step 808, call manager 300 determines a priority for the caller. Priority can be based on the phone itself and determined from a unique identifier of network endpoint 400, for example, a MAC address. Alternatively, caller's priority may be determined as part of an indication within the call request.

Once region and priority have been determined by the call manager 300, call manager 300 can then determine what codec 108 needs to be used for the communication between network endpoints 400. Call manager 300 first retrieves region-to-region information relating the caller's first region and the called party's region by bandwidth at step 812. Next, call manager 300 selects codec 108 based on the region-to-region information and the priority of the call at step 814.

Then, in step 816, call manager 300 determines whether the codec 108 is available on board network endpoints 400. If the codec is not available on the network endpoints 400, call manager 300 proceeds to step 818, in which call manager 300 finds an available codec 108 on the network 102 and connects the caller to one port 112 of that codec 108. Call manager 300 connects the called party to another port 112 of the selected codec 108 at step 820. If the codec 108 is available on board the network endpoints 400, then, in steps 822 and 824, call manager 300 sends a message to each phone requesting that endpoints 400 apply codec 108 to communications between the caller and the called party.

After codec 108 selection has been made, call manager 300 establishes a connection between the caller and the called party through codec 108 at step 826. Once the call has been completed, call manager terminates the call at step 828, and the resources are released. In step 830, the user can choose to initiate a new call from network endpoint 400. The process then proceeds to step 832, in which call manager 300 determines whether network endpoint 400 is at the same network address as it was for the previous call. If network endpoint 400 is at the same network address, then call manager 300 looks up the called party's region and repeats the call process from there. If network endpoint 400 has moved to a new address, however, then call manager 300 returns to step 804 to determine the caller's new network address, to determine a new region 104 based on that address, etc.

Figure 9:
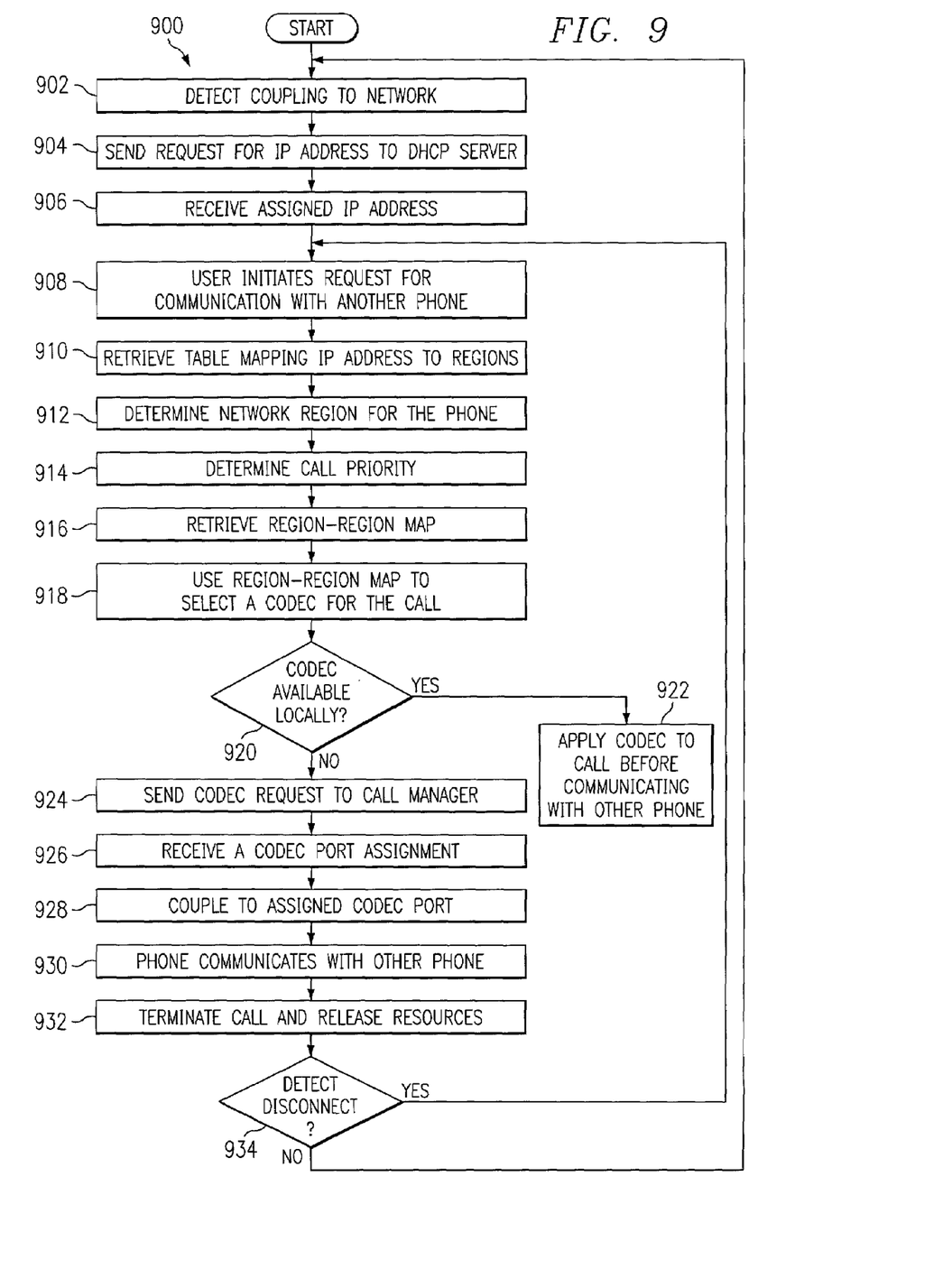
FIG. 9 shows a flowchart of a network phone determining a network region and placing a call in the communication system.

FIG. 9 is a flowchart 900 showing network endpoint 400 coupled to network 102 obtaining a network address and initiating a call. Network endpoint 400 detects that network endpoint 400 has been coupled to network 102 at step 902. Next, in step 904, network endpoint 400 sends a request for an network address to server 200. Network endpoint 400 then receives the assigned network address from server 200 at step 906.

In step 908, the user of network endpoint 400 initiates a request for communication with another network endpoint 400. Network endpoint 400 retrieves a table mapping network addresses to regions 104 at step 910. Network endpoint 400 uses the table to determine a network region 104 for network endpoint 400 at step 912. Then, in step 914, network endpoint 400 determines the priority for the call. This priority can be fixed based on the network endpoint 400 itself, or it can be determined on a call-to-call basis.

Network endpoint 400 then begins the process of codec selection. In step 916, network endpoint 400 retrieves a region-to-region map indicating bandwidth between regions. Network endpoint 400 uses the region-to-region map to select a codec 108 for the call based on bandwidth and priority at step 918. Once the codec 108 is selected, network endpoint 400 determines whether or not the codec 108 is available on board network endpoint 400 at step 920. If the codec 108 is on board, network endpoint 400 applies the codec to the call before communicating it to another network endpoint 400 at step 922. If the codec is not on board, then in step 924, network endpoint 400 sends a codec request to call manager 300. After call manager 300 receives this request, it assigns network endpoint 400 to a port 112 of the appropriate codec 108. Call manager 300 then transmits this assignment to network endpoint 400, which receives the codec port assignment at step 926. Then, in step 928, network endpoint 400 couples to the assigned codec port 112. Once this connection has been established, network endpoints 400 can communicate with one another through the connection. When the call is over, network endpoint 400 can terminate the call at step 932, and release the resources associated with it. User then has the option of placing a new call from this location or coupling network endpoint 400 to another location on the network 102. Network endpoints 400 can detect decoupling at step 934. If the user is initiating a new call from the same location, then the flowchart returns to step 908 in which the user initiates a request for communication with another endpoint 400. If, instead, endpoint 400 was decoupled, the flowchart returns to step 902 wherein endpoint 400 detects being coupled to the network 102.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for dynamically assigning a network region to a network endpoint for selecting a proper codec algorithm, comprising:

receiving a request for a network address from a network endpoint;

determining the network address for the network endpoint;

assigning a network region to the network endpoint based on the determined network address; and communicating the network address and a network location parameter specifying the network region to the network endpoint.

2. The method of claim 1, wherein:

the network address is an Internet protocol (IP) address;

the network endpoint is an IP phone; and the network endpoint communicates packet data comprising voice information using transport control protocol/Internet protocol (TCP/IP).

3. The method of claim 1, wherein determining the network address comprises:
determining a network path along which the request is communicated; and
determining the network address based on the network path.

4. The method of claim 1, wherein determining the network region comprises:
determining a subnet address portion of the network address; and
determining the network region based on the subnet address portion.

5. The method of claim 1, wherein determining the network region comprises:
determining a priority level associated with the network endpoint; and
determining the network region based on the priority level.

6. The method of claim 1, wherein the network location parameter comprises time-length-value (TLV) data.

7. A server, comprising:
an interface operable to receive a request for a network address from a network endpoint;
a memory operable to store a data structure relating a plurality of network addresses to a plurality of network regions; and
a processor operable to determine a network address and to assign a network region based on the determined network address and the memory, the processor further operable to construct a response to the request for communication to the network endpoint using the interface, the response comprising the network address for the network endpoint and a network location parameter specifying the network region for selecting a proper codec algorithm.

8. The server of claim 7, wherein:
the network address is an Internet protocol (IP) address;
the network endpoint is an IP phone; and
the network endpoint communicates packet data comprising voice information using transport control protocol/Internet protocol (TCP/IP).

9. The server of claim 7, wherein the processor is further operable to determine the network address for the network endpoint based on a network path along which the request is communicated.

10. The server of claim 7, wherein the network region is determined based on a subnet address portion of the network address.

11. The server of claim 7, wherein the data structure further relates the network region to a priority level associated with the network endpoint.

12. The server of claim 7, wherein the network location parameter comprises time-length-value (TLV) data.

13. Logic embodied in a computer-readable medium operable to cause a server to perform the following steps:
receiving a request for a network address from a network endpoint;
determining the network address for the network endpoint;
assigning a network region to the network endpoint based on the determined network address; and
communicating the network address and a network location parameter specifying the network region to the network endpoint for selecting a proper codec algorithm.

14. The logic of claim 13, wherein determining the network address comprises:
determining a network path along which the request is communicated; and
determining the network address based on the network path.

15. The logic of claim 13, wherein determining the network region comprises:
determining a subnet address portion of the network address; and
determining the network region based on the subnet address portion.

16. The logic of claim 13, wherein determining the network region comprises:
determining a priority level associated with the network endpoint; and
determining the network region based on the priority level.

17. A call manager, comprising:
an interface operable to receive a call request from a network endpoint, the call request comprising a call destination;
a memory operable to store a data structure relating a plurality of network addresses to a plurality of network regions; and
a processor operable to perform the steps of:
determining an originating network address of the network endpoint;
determining an originating network region based on the originating network address of the network endpoint;
determining a destination network address of the call destination;
assigning a destination network region to the network endpoint based on the destination network address for the call destination;
selecting a codec based on the originating network region and the destination network region; and
communicating a response indicating the selected codec to the network endpoint using the interface.

18. The call manager of claim 17, wherein the step of determining the originating network region of the network endpoint further comprises:
determining a subnet address portion of the network address; and
determining the originating network region based on the subnet address portion.

19. The call manager of claim 17, wherein:
the network address is an IP address;
the network endpoint is an IP phone; and
the network endpoint communicates packet data comprising voice information using transport control protocol/Internet protocol (TCP/IP).

20. The call manager of claim 17, wherein selecting the codec comprises:
determining an available bandwidth of a network connection between the originating network region and the destination network region; and
selecting the codec based on the available bandwidth.

21. The call manager of claim 20, wherein selecting the codec further comprises:
determining a priority level associated with the network endpoint; and selecting the codec based on the priority level.

22. A network endpoint, comprising:
an interface operable to couple the network endpoint to a network; and
a processor operable to:
  detect that the interface is coupled to a network at a network location;
  communicate a request for a network address using the interface;
  receive, from the interface, the network address;
  assign a network region to the network endpoint based on the received network address; and
  communicate via the interface a request to establish a communication between the network endpoint and a call destination; and
  use the network region to enable selection of a codec for the communication.

23. The network endpoint of claim 22, wherein:
the network location comprises a first network location, the request for a network address comprises a first request, the network address comprises a first network address, the network region comprises a first network region, and the processor is further operable to:
  detect that the interface is coupled to the network at a second network location;
  communicate a second request for a network address using the interface;
  receive a second network address from the interface; and
  determine a second network region for the network endpoint.

24. The network endpoint of claim 22, wherein:
the network address is an IP address;
the network endpoint is an IP phone; and
the network endpoint communicates packet data comprising voice information using transport control protocol/Internet protocol (TCP/IP).

25. The network endpoint of claim 22, wherein the processor is further operable to use a priority level associated with the network endpoint to enable selection of the codec.

26. The network endpoint of claim 22, wherein the processor determines the network region based on a network location parameter received from the interface.

27. The network endpoint of claim 22, wherein the processor determines the network region based on a data structure relating a plurality of network addresses to a plurality of network regions.

28. The network endpoint of claim 22, wherein:
the network endpoint further comprises a memory operable to store a plurality of codecs; and
the processor uses the network region to select one of the codecs.

29. The network endpoint of claim 22, wherein the processor uses the network region to enable selection of a codec by communicating the network region to a call manager operable to select a codec based on the network region.

30. A method for dynamically assigning a network region to a network endpoint, comprising:
  detecting that a network endpoint is coupled to a network at a network location;
  communicating from the network endpoint a request for a network address;
  receiving a network address for the network endpoint;
  assigning a network region to the network endpoint based on the received network address;
  communicating a request for a communication between the network endpoint and a call destination; and
  using the network region to enable selection of a codec for the communication.

31. The method of claim 30, wherein:
the network address is an IP address;
the network endpoint is an IP phone; and
the network endpoint communicates packet data comprising voice information using transport control protocol/Internet protocol (TCP/IP).

32. The method of claim 30, wherein:
the network location comprises a first network location, the request for a network address comprises a first request, the network address comprises a first network address, the network region comprises a first network region, and the method further comprises:
  detecting that the network endpoint is coupled to the network at a second network location;
  communicating a second request for a network address;
  receiving a second network address; and
  determining a second network region for the network endpoint.

33. The method of claim 30, wherein determining the network region for the network endpoint comprises:
  receiving a network location parameter; and
  determining the network region based on the network location parameter.

34. The method of claim 30, wherein determining the network region for the network endpoint comprises:
  retrieving from memory a data structure relating a plurality of network address with a plurality of network regions; and
  determining the network region of the network endpoint based on the network address using the data structure.

35. The method of claim 30, wherein using the network region to enable selection of a codec comprises using the network region to select one of a plurality of codecs stored in a memory of the network endpoint.

36. The method of claim 30, wherein using the network region to enable selection of a codec comprises communicating the network region to a call manager operable to select the codec for the communication.

37. Logic embodied in a computer-readable medium operable to perform the steps of:
  detecting that a network endpoint is coupled to a network at a network location;
  communicating from the network endpoint a request for a network address;
  receiving a network address for the network endpoint;
  assigning a network region to the network endpoint based on the received network address;
  communicating a request for a communication between the network endpoint and a call destination; and
  using the network region to enable selection of a codec for the communication.

38. The logic of claim 37, wherein determining the network region for the network endpoint comprises:
  receiving a network location parameter; and
  determining the network region based on the network location parameter.

39. The logic of claim 37, wherein determining the network region for the network endpoint comprises:
  retrieving from memory a data structure relating a plurality of network address with a plurality of network regions; and
  determining the network region of the network endpoint based on the network address using the data structure.

40. A network endpoint, comprising:

means for detecting that a network endpoint is coupled to a network at a network location;

means for communicating from the network endpoint a request for a network address;

means for receiving a network address for the network endpoint;

means for assigning a network region to the network endpoint based on the received network address;

means for communicating a request for a communication between the network endpoint and a call destination; and means for using the network region to enable selection of a codec for the communication.

* * * * *